(12) United States Patent
Godwin et al.

(10) Patent No.: US 7,996,815 B2
(45) Date of Patent: Aug. 9, 2011

(54) METHOD, SYSTEM AND COMPUTER STORAGE MEDIUM FOR TEST TOOL DEVELOPMENT

(75) Inventors: David R. Godwin, Whitby (CA); Aslam F. Nomani, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1365 days.

(21) Appl. No.: 11/531,286

(22) Filed: Sep. 13, 2006

(65) Prior Publication Data

US 2008/0127033 A1     May 29, 2008

(51) Int. Cl.
   *G06F 9/44*     (2006.01)
(52) U.S. Cl. ......... 717/124; 717/100; 717/106; 717/125
(58) Field of Classification Search .................. None
   See application file for complete search history.

(56) References Cited

U.S. PATENT DOCUMENTS

| | | | |
|---|---|---|---|
| 5,754,760 A * | 5/1998 | Warfield | ............ 714/38 |
| 6,002,868 A | 12/1999 | Jenkins et al. | |
| 6,006,022 A | 12/1999 | Rhim et al. | |
| 6,895,578 B1 * | 5/2005 | Kolawa et al. | ............ 717/130 |
| 6,898,735 B2 | 5/2005 | Tuttle | |
| 6,910,158 B2 | 6/2005 | Jones et al. | |
| 6,915,455 B2 | 7/2005 | Jones et al. | |
| 7,707,553 B2 * | 4/2010 | Roques et al. | ............ 717/124 |
| 2003/0046613 A1 * | 3/2003 | Farchi et al. | ............ 714/38 |
| 2003/0204784 A1 | 10/2003 | Jorapur | |
| 2004/0107415 A1 * | 6/2004 | Melamed et al. | ............ 717/124 |
| 2005/0120276 A1 * | 6/2005 | Kolawa et al. | ............ 714/38 |
| 2006/0195681 A1 * | 8/2006 | Craske et al. | ............ 712/224 |
| 2007/0006153 A1 * | 1/2007 | Sultan | ............ 717/124 |
| 2007/0240127 A1 * | 10/2007 | Roques et al. | ............ 717/136 |

OTHER PUBLICATIONS

Automated Tools to Implement and Test Internet Systems in Reconfigurable Hardware, John W. Lockwood et al., ACM SIGCOMM Computer Communications Review, vol. 33, No. 3: Jul. 2003, pp. 103-110.
Observations and Lessons Learned from Automated Testing, Stefan Berner, et al., Zuhlke Engineering AG, 2005, pp. 571-579.

* cited by examiner

*Primary Examiner* — Insun Kang
(74) *Attorney, Agent, or Firm* — Cantor Colburn LLP; Libby Toub

(57) ABSTRACT

A test tool infrastructure comprising: a test tool interface for generating a test tool module, the test tool interface including: a variable declaration input to create a variable declaration block of the test tool module, the variable declaration block user can declare fixed string variables, random integer variables and random string variables; a preparation input to create a preparation block of the test tool module, the preparation block including processes executed once for the entire program; an initial input to create an initial block of the test tool module, the initial block including processes executed once for each client specified in the initial block; a loop input to create loop block of the test tool module, the loop block including processes executed a number of times specified in an iteration command; a cleanup input to create a cleanup block of the test tool module, the cleanup block including clean-up processes executed once for each client; and a terminate input to create a terminate preparation block of the test tool module, the terminate preparation block including clean-up processes executed once for the entire program.

5 Claims, 3 Drawing Sheets

US 7,996,815 B2

METHOD, SYSTEM AND COMPUTER STORAGE MEDIUM FOR TEST TOOL DEVELOPMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to test tool development, and particularly to a test tool development infrastructure that facilitates creation of test tools.

2. Description of Background

Test tools are used to verify the correct functioning of new software and modifications to existing software. Verifying the correctness of software may involve numerous tasks ranging from ensuring coding syntax through successful compilation, to checking the execution results by examining the output of a software program. Developing test tools requires relatively extensive programming skills in languages such as C, Java, or Perl. This tends to result in a dedicated group of people focused on building test tools and another group of people who use the test tools. There is difficulty in becoming proficient with the languages with traditional programming languages like C, Perl or Java. Further, test tools in these languages are more difficult to dynamically modify, as another user would need to understand the code logic. Traditional programming languages such as Kourne Shell or DOS have similar drawbacks, and are also not platform independent. The STAF/STAX platform has a difficult learning curve, as it still requires to understand/learn a new programming language.

There is a need in the art for a test tool development infrastructure that facilitates generation of test tools.

SUMMARY OF THE INVENTION

The shortcomings of the prior art are overcome and additional advantages are provided through the provision of a test tool infrastructure comprising: a test tool interface for generating a test tool module, the test tool interface including: a variable declaration input to create a variable declaration block of the test tool module, the variable declaration block user can declare fixed string variables, random integer variables and random string variables; a preparation input to create a preparation block of the test tool module, the preparation block including processes executed once for the entire program; an initial input to create an initial block of the test tool module, the initial block including processes executed once for each client specified in the initial block; a loop input to create loop block of the test tool module, the loop block including processes executed a number of times specified in an iteration command; a cleanup input to create a cleanup block of the test tool module, the cleanup block including clean-up processes executed once for each client; and a terminate input to create a terminate preparation block of the test tool module, the terminate preparation block including cleanup processes executed once for the entire program.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which facilitates creation of test tools through a test tool infrastructure that provides a platform independent test tool development environment that allows end users to quickly deploy powerful test modules, even if they have minimal programming expertise.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
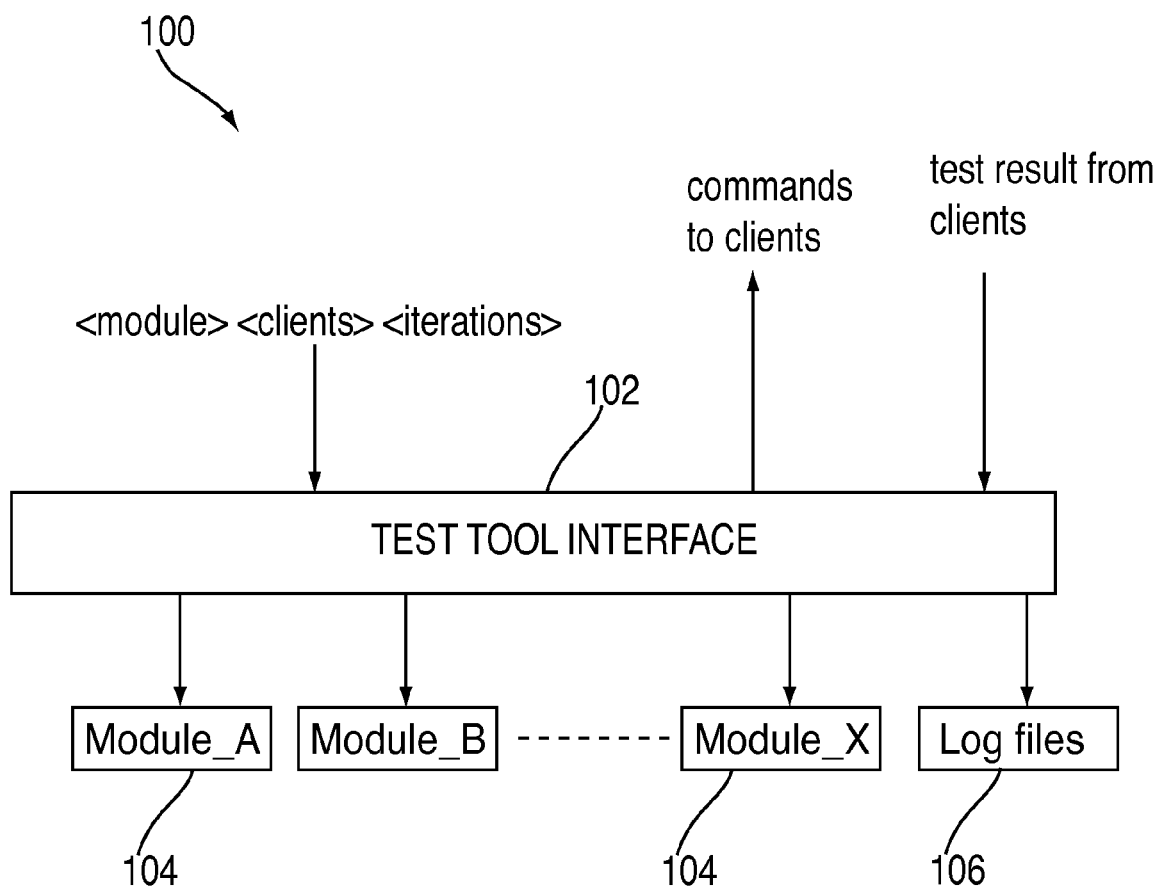
FIG. 1 illustrates one example of test tool infrastructure.

FIG. 1 illustrates one example of test tool infrastructure 100 for a test tool development application. The test tool development application may be implemented on a general-purpose computer executing a computer program stored in a storage medium to implement the processing described herein. The test tool infrastructure 100 includes a test tool interface 102 through which a user can create test tool modules 104. To initiate the test tool, the user designates the test tool module to be executed, the clients to be tested (e.g., the software that is being tested) and the number of iterations that the module is to run. The designated test tool module 104 is executed and sends commands to the clients identified by the user. Test results from the clients are obtained and may be stored in log files 106.

The test tool interface 102 provides the user with a simplified interface for defining test tool modules 104. In typical test organizations, a small subset of people is allocated to develop test tools. This is because the traditional programming languages such as C, Java, or Perl provide enough complexities that a certain level of expertise is required to efficiently write programs in these languages. Test tool interface 102 breaks the barriers of the complexities associated with writing test tools and allows novice programmers to efficiently write test modules. This leads to a paradigm shift where test tools are now being written by testers, the persons with the greatest expertise in finding defects.

Figure 2:
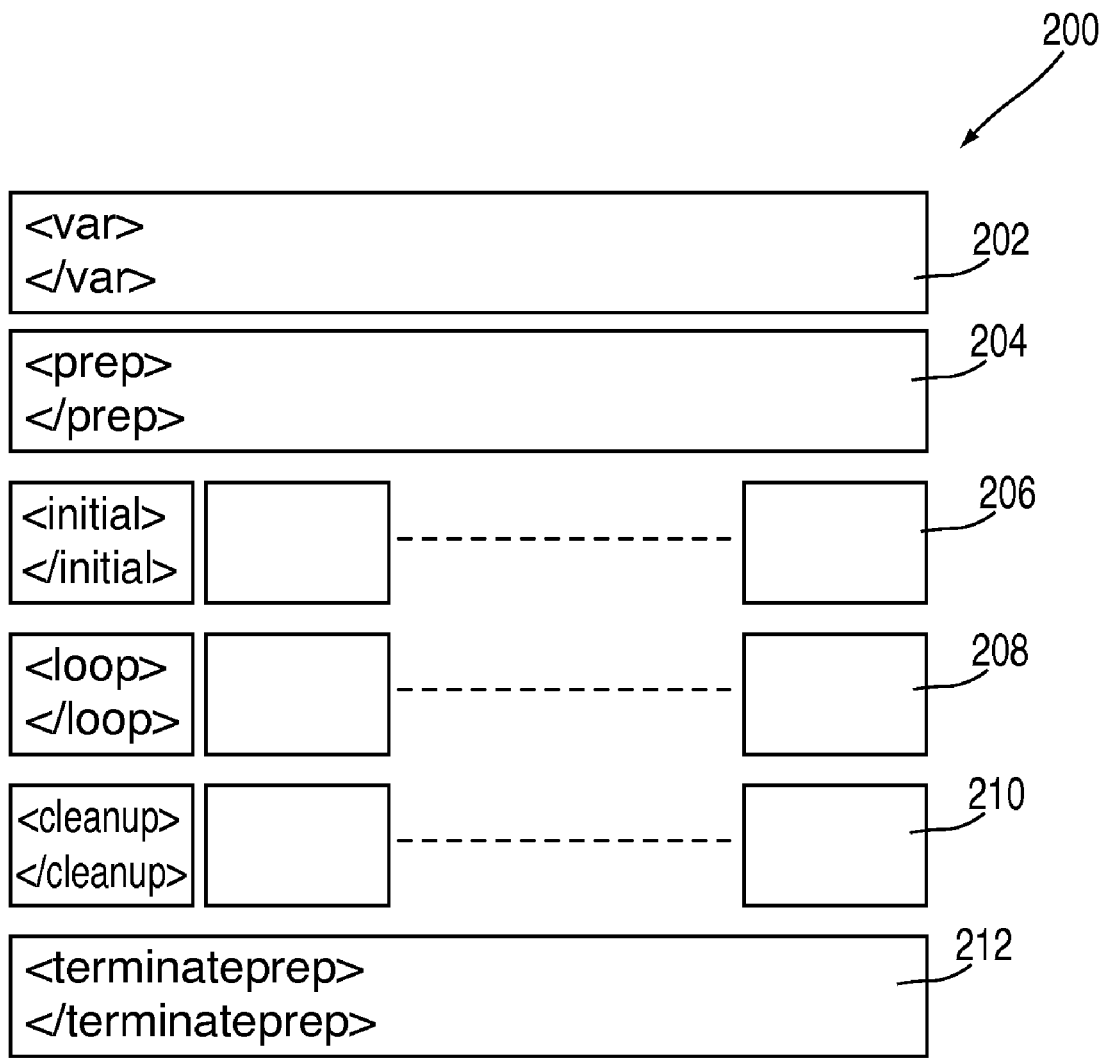
FIG. 2 illustrates one example of blocks defining a test module.

FIG. 2 illustrates various blocks that make up a test module 104. The simplicity and efficiency of the test tool infrastructure 100 becomes clear when writing the test tool modules 104. The user begins each test module 104 with a template 200 that identifies six blocks that make up the test tool module 104. Each block is enclosed by simple markup syntax to identify its start and end. Each block is executed in sequence from the top to the bottom. Multiple clients are forked to execute through the initial, loop, and cleanup blocks.

One of the blocks making up the test tool module 104 is a variable declaration block 202. The variable declaration block 202, shown as var, is the variable declaration section and has global scope. The user can declare fixed string variables, random integer variables and random string variables in the variable declaration block 202. The ability to define variables that are randomly selected from a list allows for combinations to be tested. The more random combinations generated, the better the overall test coverage will be. The test tool infrastructure 100 also has some built in variables. One built-in variable is ITR, which represents the current iteration number the client is executing. Another built-in variable is CLIENT_NAME, which represents the module name (excluding any file name extensions) concatenated with the client number. Client number starts from one and goes up to the number of clients that is specified.

The following illustrates a sample variable declaration section and the features that can be used.

```
</var>
// Define a fixed variable string
$DNAME$=sample
// Define an random integer from −6 to 10000
$INCREASESIZE$=[−6..10000]
// Define a string variable that can be one of multiple random values
$TABLESPACES$=SYSCATSPACE,TEMPSPACE1,USERSPACE1
</var>
```

Another block making up the test tool module 104 is a preparation block 204, shown as prep. The preparation block 204 is the preparation section that is executed once for the entire program. At this point in the execution of the test tool, the multiple clients have still not been forked. The following illustrates a sample preparation block 204.

```
<prep>
//Create a database using the database name specified in the variable
declaration section
db2 create db $DBNAME$
</prep>
```

Another block making up the test tool module 104 is an initial block 206, shown as initial. The initial block 206 is executed once for each client specified. The ability to have multiple clients executing the test module simultaneously allows the test tool infrastructure to find defects related to multiple concurrent clients. As objects may be unique across clients, the test tool infrastructure provides a built-in variable called $CLIENT_NAME$. Variable $CLIENT_NAME$ is the module name, not including any file name extensions, concatenated with the client number. The client number will start from one and increment to the number of clients specified. The following illustrates a sample initial block 206 and the use of the built-in variables.

```
<initial>
//Connect to the database
db2 connect to $DBNAME$
//Create a unique table for each client
db2 create table table$CLIENT_NAME$ (i int)
<initial>
```

Another block making up the test tool module 104 is a loop block 208, shown as loop. The loop block 208 is similar to the initial block 206, except the entire loop block 208 is executed the number of times as what is specified in the iteration command from the user. For example, if the number of iterations is specified as 2, then each client will execute the loop block 208 twice. Optionally, the iterations value could be set to infinite, at which point the test execution can be interrupted by issuing a break command (e.g., ctrl-c key strokes). The looping feature allows repetitive execution of the same commands. The repetition helps surface problems that are a result of a small timing window or problems related to leaks. The iterative testing also allows for the creation of a large number of objects that will help test boundary conditions. The following illustrates a sample loop block 208 that inserts a value into a table.

```
<loop>
// insert the value of the current iteration number into a table called
table$CLIENT_NAME
db2 insert into table$CLIENT_NAME$ values ($ITR$)
</loop>
```

Another block making up the test tool module 104 is a cleanup block 210, shown as cleanup. The cleanup block 210 is executed once for each client. This block is intended to run clean-up operations for individual clients. The following illustrates a sample cleanup block 210.

```
<cleanup>
//drop the table used by each client
db2 drop table table$CLIENT_NAME$
</cleanup>
```

Another block making up the test tool module 104 is a terminate preparation block 212, show as terminateprep. The terminate preparation block 212 is executed once for the entire program. The terminate preparation block 212 is intended to run clean-up operations. The following illustrates a sample terminate preparation block 212.

```
<terminateprep>
// force all applications off the database, sleep 60 seconds, and then
drop the database
db2 force applications all
#SLEEP#=60
db2 drop database $DBNAME$
</terminateprep>
```

Figure 3:
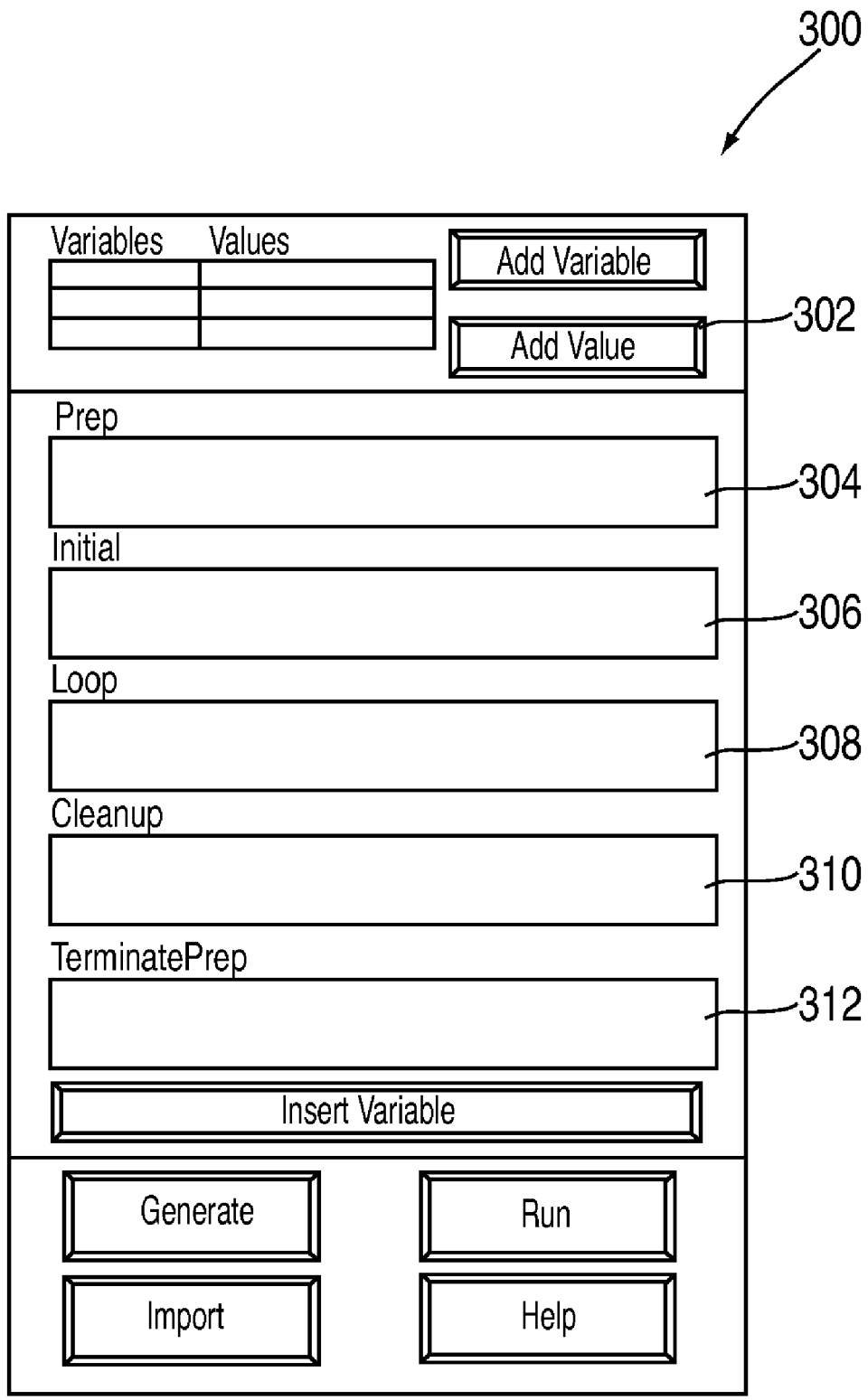
FIG. 3 illustrates one example of a user interface for creating or editing a test module.

FIG. 3 illustrates one example of a user interface 300 for creating or editing a test module. The user interface includes input fields 302-312 that allows the user to enter text to define the blocks 202-212 described with reference to FIG. 2. The user interface allows the user to create text-based test tool modules using the same syntax regardless of the operating system.

The test tool infrastructure masks the complexities of programming languages so that end-user product experts can write test modules with ease. The test tool infrastructure enables numerous features. The platform independent test modules are text based modules that utilize the same syntax regardless of the operating system. Fast deployment of test modules is provided. The use of minimal syntax to create test modules allows persons with little programming skills to write test modules. This shifts the focus to writing application commands as opposed to the programming constructs. Built in primitives also provides fast deployment of features such as looping, variables, random values, sleep. Further, the text based modules require no compilation.

Fast modification of test modules 104 is also provided by using minimal syntax that allows for easy understanding of test modules. No compilation is required modules are immediately ready to be run on heterogeneous operating systems. Test modules may be executed on multiple clients by automatic forking of multiple clients with an option to allow objects for each client to be unique. The execution of all commands will be stored in log files 106 for analysis. Users may also add comments to the test tool modules 104 to provide guidance to other users of the test tool.

By using these key features, very effective and powerful test modules can be written in an efficient manner. Since these key features are constantly reused in defining test modules, the test tool infrastructure provides these built-in features such that the writer of the test module can focus on application commands as opposed to complexities of writing the test driver itself.

The test tool infrastructure provides an environment where most of the key programming constructs required to create a test driver are immediately available without the associated learning curves that come with other programming languages. Since the key features are already built into the test tool infrastructure, the module writer can focus on application commands, and thus deliver a much higher quality test driver quicker than using traditional programming languages.

The complexities associated with existing test tools written in traditional programming languages also means the tester is less likely to build or modify the test tools. The probability that a novice programmer can efficiently modify a C program with a new application call, and then recompile that program for all platforms is low. The test tool infrastructure rectifies this issue, as almost every line in the test module is either a comment or an application command. The tester is an expert in the application commands and is easily able to modify test modules to address the test gap. The tester can then choose to update the master test module that each organization will keep, or only maintain the changes on their local copy. Since no recompilation is necessary, the changes are immediately available for execution.

Each tester has their own perspective on how to break a certain feature. With the use of the test tool infrastructure, the testers ideas will be represented in the test module that they create. By placing these test modules in a centralized location, all testers have immediate access to ideas generated by other testers. Since the test tool infrastructure modules mostly include application commands and comments, testers will be able to extract the test strategy used within these modules with ease. And due to the ease of modifying the test module, the strategies of multiple testers can easily be incorporated into a single module.

The test tool infrastructure introduces a paradigm shift in test tool development where testers can efficiently generate powerful test modules, regardless of their skills with programming languages. The complexities of programming languages are masked, while still maintaining many of the powerful constructs programming languages provide. The inherent simplicity of test module generation within the test tool infrastructure will allow for a shift in focus from how to code the test program to how to best test the application. The majority of the test module contains the commands to test the application as opposed to the programmatic syntax required to control the test program.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A test tool infrastructure embodied on a storage device for providing a platform impendent test tool development environment comprising:
   a test tool interface for generating a platform independent test tool module that requires no compilation, the test tool interface including:
      a variable declaration input to create a variable declaration block of the test tool module, the variable declaration block user can declare fixed string variables, random integer variables and random string variables;
      a preparation input to create a preparation block of the test tool module, the preparation block including processes executed once for the entire program;
      an initial input to create an initial block of the test tool module, the initial block including processes executed once for each client specified in the initial block;
      a loop input to create loop block of the test tool module, the loop block including processes executed a number of times specified in an iteration command;
      a cleanup input to create a cleanup block of the test tool module, the cleanup block including clean-up processes executed once for each client; and
      a terminate input to create a terminate preparation block of the test tool module, the terminate preparation block including clean-up processes executed once for the entire program.

2. The test tool infrastructure of claim 1 further comprising:
   a plurality of test tool modules.

3. The test tool infrastructure of claim 1 wherein:
the test tool interface receives an input command designating a module, clients to be tested by the module and iterations of test.

4. The test tool infrastructure of claim 3 further comprising:
log files for storing test results from the clients.

5. The test tool infrastructure of claim 1 wherein:
the variable declaration input, the preparation input, the initial input, the loop input, the cleanup input and the terminate input are textual inputs.

* * * * *